July 21, 1959 G. A. LYON 2,895,418
BOMB HEAD CONSTRUCTION
Filed March 28, 1955
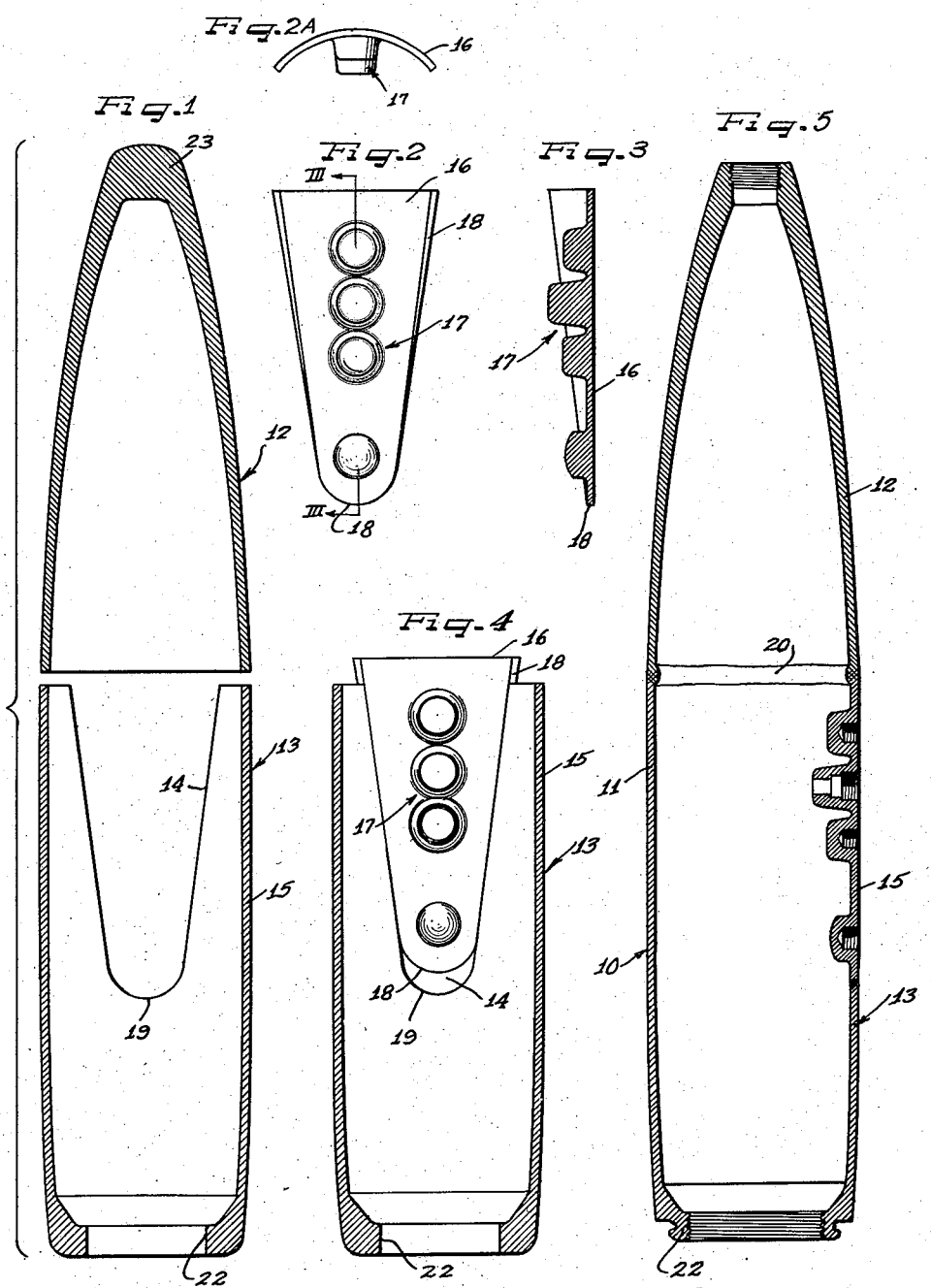
Inventor
GEORGE ALBERT LYON

2,895,418
BOMB HEAD CONSTRUCTION

George Albert Lyon, Detroit, Mich.

Application March 28, 1955, Serial No. 497,269

3 Claims. (Cl. 102—2)

This invention relates to a bomb head construction and to a method by which suspension or retaining means may be provided for same.

In the manufacture of the more modern streamlined low drag-type bombs one of the most pressing problems is in the provision of suitable suspension means such as stud sockets for carrying the bomb on the underside of the wing of an airplane or the like.

The suspension means is ordinarily mounted on the side wall of the shell or casing of the bomb at a balanced point somewhere between the ends of the shell. In the past due to the relatively great length of the casing it has been necessary to utilize special apparatus or the like to extend into the casing to the socket zone area in the formation of the stud area.

It is therefore an object of this invention to provide a method of attaching suspension means on the wall of a bomb casing which does not require the use of more cumbersome techniques.

A further object of the invention is to provide an improved method of making low drag bombs in a manner to facilitate securing drop ring sockets thereto.

Still another object of this invention is to provide a simple but inexpensive way of attaching bomb hanger or drop ring sockets to the wall of a bomb casing which readily lends itself to production on a large scale.

A further object of this invention is to forge the studs contemporaneously with an insert plate of such configuration so as to be readily securable within a corresponding indentation or recess in the wall of the bomb casing.

A still further object of this invention is to provide stud retaining means on the wall of the bomb casing which will better resist any propensity of outside forces or elements to break the connection between the studs and the casing.

In accordance with the general features of the invention there is provided in a bomb or the like a cylindrical casing-like body comprising at least two longitudinal tubular sections, namely, a nose section and a lower section, one of the sections having a portion of its wall recessed longitudinally from an end edge thereof, a hanger stud segment in the recess and means comprising a welded joint between the sections for holding them in longitudinal alignment with the segment secured in the recess.

Other features relate to the aforesaid segment having metallurgical characteristics different from that of the section for reinforcing the hanger stud area of the bomb and the segment being incorporated in the recess prior to the welding of the sections together.

Other objects, features and advantages of the present invention will be readily apparent from the following detailed description of a preferred embodiment thereof, taken in conjunction with the accompanying drawings, in which:

Figure 1 is a longitudinal sectional exploded view showing the two parts of a bomb head casing or shell embodying features of the present invention but with the segment omitted.

Figure 2 is a side view as seen on the underside of the wedge-shaped segment or insert with the studs forged therewith;

Figure 2a is an end view of the segment looking downward;

Figure 3 is a cross-sectional view taken on the line III—III of Figure 2 showing my novel stud retaining means forged integral with the wedge-shaped insert;

Figure 4 is a fragmentary longitudinal sectional view of the lower casing section as seen from the interior thereof showing how the wedge-shaped insert is progressively internested with the recess or indentation provided therein; and Figure 5 is a longitudinal sectional view through the bomb head casing or shell after assembly thereof, ready for assembly with other components to make up a complete bomb.

As shown on the drawings:

Since my invention will be best understood from a detailed description made in conjunction with the steps of my novel method I shall now relate in detail the steps of my novel method.

The first step of my method in the construction of the instant streamlined low drag type bomb casing or body 10 (Figure 5) is the drawing and forming of the generally tubular bomb casing shell, or body 11 from rolled steel plate such as low carbon steel or the like into at least two tubular sections, as best seen at 12 and 13 of Figure 1. It will be appreciated that this may be effected in any suitable manner, and that the casing may be constructed of more than two sections if desired. For a preferred method of construction see my copending case entitled, "Bomb Head Construction," filed December 27, 1954, Serial No. 477,773.

The next step of my novel method is in the forming of a recess, indentation or cut out 14 in the annular side wall 15 of one of the casing sections. The recess 14 is of a predetermined configuration preferably a generally wedge or pie shape opening (Figure 1) and is shown in the illustrated embodiment as extending downwardly from the top end edge of the lower section 13.

The next step in my method of construction is the forming of a steel segment or curved plate 16 with a series of integral studs 17 located thereon in a predetermined relationship. The member 16 is forged into a generally wedge or pie shaped member of the same general cross-sectional size and arcuate curvature as that of the side wall 15 where the recess or cut out 14 has been made.

The advantage of the foregoing forging operation is that better or more desirable metallurgical characteristics are obtainable through forging the plate 16 and studs 17 together as opposed to butt welding the studs to the bomb casing or the like. In other words, the steel of the segment 16 is of different or sturdier characteristics than that of the steel comprising the casing sections 12 and 13.

The forging of the plate 16 and its integral studs in one operation minimizes any propensity of moisture or the like from seeping into the interior of the bomb adjacent the junction of the studs 17 with the plate 16. This is to be distinguished from other techniques of attaching retaining means to the bomb casing body such as welding the studs to the wall of the bomb shell 11 which other modes have a tendency to give rise to defects such as cracks and improper welding which permit moisture to seep in and ruin the powder charge.

After the segment or plate 16 has been formed along with the studs 17 the plate is then finished which includes removal of any flash along with any other undesired irregularities.

The plate 16 is then in condition to be progressively telescoped within the indentation or recess 14 in the wall 15 of the section 13. It will be appreciated that the recess has been formed in the area approximating the ultimate center of mass of the bomb with the studs 17 on the plate 16 being positioned as nearly as possible to the ultimate center of mass.

After the wedge-shaped plate 16 has been completely telescoped within the indentation or recess 14 the wedging surface or edge 18 of the arcuate plate 16 is suitably secured to the receiving edge 19 defining the recess, preferably by a suitable welding operation such as butt welding.

Subsequently the sections 12 and 13 are joined at 20 by means of welding as best seen in Figure 5 with any resulting flash or the like being thereafter removed.

Each of the studs is then drilled and tapped to form a socket 21 which is capable of receiving a drop ring (not shown) which is utilized to secure the bomb on the underside of the airplane wing or the like. Such tapping and threading may be optionally done before or after the segment is secured in place in the section 13.

After the sections 12 and 13 defining the bomb casing 11 have been joined, as by welding, the base 22 and the nose 23 of the casing are machined according to specification. The bomb shell 11 is then in condition to have assembled within it other component parts (not shown) including the head and tail assemblies and the powder charge.

Thus, it is now possible through the employment of the instant method to forge the bomb suspension means defined by the studs with a plate which is in effect a fragment of the bomb casing and thereafter to assemble the components in the manner above described. By virtue of the aforementioned forging operation the manufacturer's problem of providing suspension means for the bomb is greatly simplified and improved since the possibility of moisture seeping through any openings defined by the socket which may arise in other methods due to improper welding techniques or cracking of the surfaces defined by the socket is substantially eliminated.

In forging the studs integral with the plate or segment 16 it will be appreciated that a better grade of steel may be used if desired so as to obtain maximum strength along with the best possible metal characteristics without greatly increasing the overall cost as would be the case if the whole casing was made of the better grade of metal.

While the steps of my novel method have been described generally in chronological order it will be appreciated that certain of the steps may be interchanged without departing from the instant invention.

It will be understood that modifications and variations may be effected without departing from the scope of the novel concepts of the present invention.

I claim as my invention:

1. In a bomb or the like, a cylindrical casing-like body comprising at least two longitudinal tubular sections, namely, a nose section and a lower section, one of said sections having a portion of its wall recessed longitudinally from an end edge thereof, a hanger stud segment in said recess and means comprising a welded joint between said sections for holding them in longitudinal alignment and with said other section bearing endwise against an end of said segment at the joint, said segment having metallurgical characteristics different from that of said sections for reinforcing the hanger stud area of the bomb and said segment being incorporated in said recess prior to the welding of said sections together, said stud segment having a series of studs projecting internally of the tubular sections and having threaded recesses opening exteriorly of the tubular sections for receipt of hanger elements.

2. In a low drag bomb structure, a tubular cylindrical casing comprised of a plurality of superimposed stacked sections, one of said sections having a wedge-shaped circumferentially arched recess with the recess opening longitudinally of the adjoining superimposed stacked section, a wedge-shaped circumferentially arched plate corresponding generally to the configuration of the recess nestingly welded therein, said associated section and plate having a common tubular edge area engaged with and welded to the adjoining superimposed stacked section, and a series of hanger studs on the tubular casing disposed on an inner side of the arched plate and with said plate and hanger studs having a series of socket areas therein opening externally of the tubular casing for the receipt of hanger elements.

3. In a projectile structure, a tubular cylindrical casing comprised of a plurality of superimposed stacked sections, one of said sections having a wedge-shaped circumferentially arched recess with the recess opening longitudinally of the adjoining superimposed stacked section, and a wedge-shaped circumferentially arched plate corresponding generally to the configuration of the recess nestingly welded therein, said associated section and plate having a common tubular edge area engaged with and welded to the adjoining superimposed stacked section, said plate being made of sturdier material than that of said sections so as to be more resistant to distortion when subjected to outside forces.

References Cited in the file of this patent

UNITED STATES PATENTS

| 424,442 | Wood | Mar. 25, 1890 |
| 1,817,580 | Pierce | Aug. 4, 1931 |

FOREIGN PATENTS

| 472,654 | Great Britain | Sept. 27, 1937 |
| 554,833 | Great Britain | July 21, 1943 |